(12) United States Patent
Wiseman et al.

(10) Patent No.: US 7,043,835 B2
(45) Date of Patent: May 16, 2006

(54) METHOD FOR CENTERING A WORKPIECE ON THE CYLINDRICAL AXIS OF A BORE

(75) Inventors: Robert B. Wiseman, Athens, OH (US); Floyd Largent, New Plymouth, OH (US); David E. Weeks, Athens, OH (US)

(73) Assignee: Sunpower, Inc., Athens, OH (US)

( * ) Notice: Subject to any disclaimer, the term of this patent is extended or adjusted under 35 U.S.C. 154(b) by 228 days.

(21) Appl. No.: 10/821,436

(22) Filed: Apr. 9, 2004

(65) Prior Publication Data

US 2005/0223531 A1    Oct. 13, 2005

(51) Int. Cl.
 *B23P 11/00*    (2006.01)
(52) U.S. Cl. .............................. 29/888.044; 29/407.05; 29/407.09; 29/407.1; 29/434; 29/407.04; 29/703
(58) Field of Classification Search ............ 29/888.044, 29/407.01, 407.04, 407.05, 407.09, 407.1, 29/434, 702, 703, 712; 33/60, 645
See application file for complete search history.

(56) References Cited

U.S. PATENT DOCUMENTS

| 2,336,860 | A |   | 12/1943 | Graham |
| 3,357,091 | A | * | 12/1967 | Reissmueller et al. ...... 228/105 |
| 4,196,523 | A |   | 4/1980 | Nagata et al. |
| 4,663,658 | A |   | 5/1987 | Lanne et al. |
| 4,964,224 | A | * | 10/1990 | Jackson ........................ 33/645 |
| 5,148,591 | A | * | 9/1992 | Pryor ....................... 29/407.04 |
| 6,438,833 | B1 | * | 8/2002 | Cook et al. .............. 29/888.01 |

* cited by examiner

*Primary Examiner*—Jermie E. Cozart
(74) *Attorney, Agent, or Firm*—Frank H. Foster; Kremblas, Foster, Phillips & Pollick

(57) ABSTRACT

A method and system for precisely centering a workpiece within a cylindrical bore such that the center of the workpiece is coaxial with the central axis of the bore. An arbor is used within the cylindrical bore to sense and calculate the location of the central axis. The position of the workpiece is also sensed so that it can be aligned with the central axis. A computer system is used to perform the calculations and provide an indication of alignment of the workpiece and the central axis. The position of the central axis and the workpiece are found via a location determining system that may incorporate electromechanical and optical position sensing systems. For instance, a plurality of light transmitters and light receivers may be used to generate and transmit beams of light used in determining positions. The method has particular application to free piston machines, and particularly free piston coolers.

7 Claims, 11 Drawing Sheets

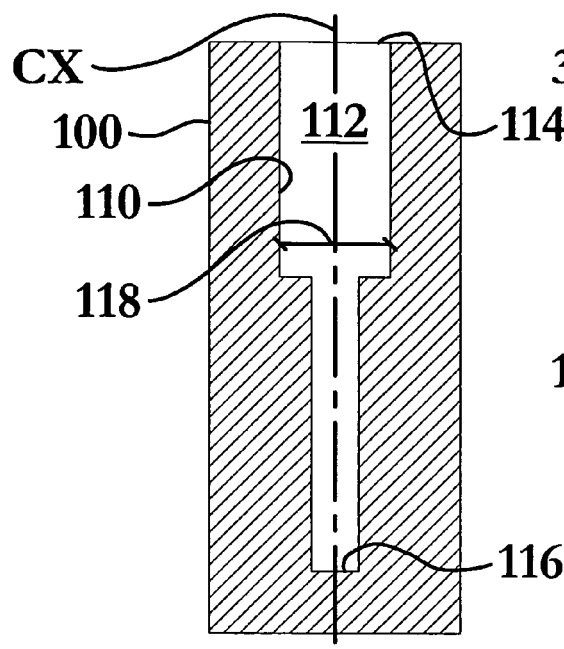
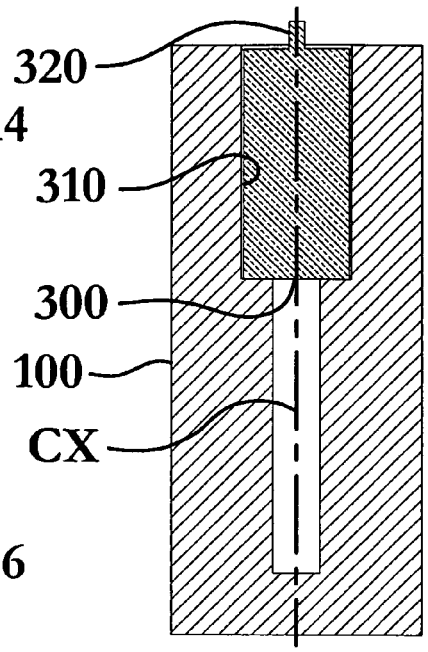
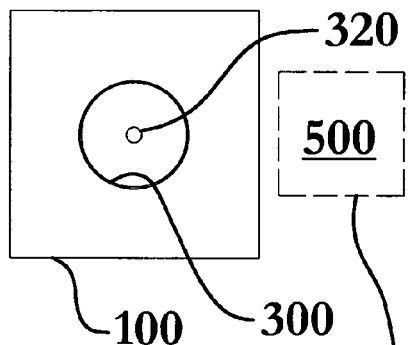
FIG. 1
FIG. 2
FIG. 3

METHOD FOR CENTERING A WORKPIECE ON THE CYLINDRICAL AXIS OF A BORE

TECHNICAL FIELD

The present invention relates to the field of equipment positioning systems and, more particularly, to a method and system for precisely positioning a workpiece on the central axis of a cylindrical bore.

BACKGROUND OF THE INVENTION

Various industries that manufacture and assemble machinery having close tolerance, reciprocating parts have recognized the importance of having precise alignment among the reciprocating parts and the stationary components. The importance of such alignment may be explained using the widely applicable example of a piston reciprocating in a cylindrical bore. The simplest example is a piston that is free to reciprocate within the cylindrical bore with its path of reciprocation in the bore not restricted by anything except the bore. The movement of such a piston is guided by the surrounding walls of the cylindrical bore so there is no need for alignment.

However, if such a piston also has an axial hole through the center and slides on an axially aligned rod passing through the hole, the path of reciprocation is determined by both the walls of the cylindrical bore and the rod. Therefore, if the rod upon which the piston slides is sufficiently out of alignment with the central axis of the cylindrical bore, then at some point during the stroke of the piston where the rod is displaced radially from the central axis, the clearance, which should be a constant throughout the length of the stroke, will become nonexistent and excessive contact will occur. Such contact is often very damaging to the equipment and extremely difficult to repair, if not irreparable. Additionally, such contact will often wear down the various components thereby reducing the efficiency of the machine or causing it to malfunction.

In the past, centering of such components was performed manually. Human errors, compounded with errors from manual measurement equipment, did not provide the level of precision that is required by today's tolerances. Additionally, such manual determinations are difficult and time consuming for even the most skilled machinist. Further, often the alignment needs to be performed to a greater accuracy than can be achieved by a purely mechanical device.

More recently, semi-automated centering devices have been developed but they generally include a multitude of gages, meters, and indicators that must be carefully attached to the bore and are often extremely sensitive. Further, it is often necessary for such gages, meters, and indicators to extend into the bore to perform their functions, making them difficult to use, adjust, and read. Advanced optical alignment systems do exist, however they often require precision optics to produce predetermined patterns of light and are often extremely sensitive and cost prohibitive.

Precise centering of reciprocating components within a cylindrical bore is a need often encountered in the field of free piston machines, particularly Stirling devices such as Stirling engines and coolers. The efficiency of such devices is dependent upon exacting tolerances between the stationary and reciprocating components. In fact, the radial clearance between such components is often 12 to 13 microns.

Free piston coolers operating with such close tolerances generally incorporate linear gas bearings as well as specially designed surface coatings, such as fluoropolymers, on the reciprocating components. The radial loading on the linear gas bearings is minimized by attempting to maintain a consistent clearance throughout the stroke of the reciprocating components. In order to maintain a consistent clearance throughout the stroke of a free piston machine, the rod that passes through a hole in the piston along which the piston slides, such as the displacer rod, must be perfectly centered within the bore. When the displacer rod is not perfectly centered, the piston sidewalls approach the bore walls at some point during the stroke thereby getting closer than the desired clearance and increasing the radial bearing load. Only a slight misalignment of the displacer rod may result in contact between the piston and the bore. Therefore, misalignment of the displacer rod results in reduced bearing life as well as undue wear on the various components of a free piston machine.

Accordingly, there is a need for a precise centering method and system that is economical, portable, and easy for an unskilled operator to use. While some of the prior art devices attempted to improve the state of the art of centering systems, none have achieved the beneficial attributes of the present invention. With these capabilities taken into consideration, the instant invention addresses many of the shortcomings of the prior art and offers significant benefits heretofore unavailable.

SUMMARY OF INVENTION

This invention recognizes that numerous industries require the ability to accurately center a workpiece within a cylindrical bore such that the center of the workpiece is coaxial with the central axis of the cylindrical bore. This is particularly true in applications wherein the workpiece reciprocates within the cylindrical bore.

The present invention is directed to precisely centering a workpiece within a cylindrical bore such that the center of the workpiece is substantially coaxial with the central axis of the bore. The method first senses and calculates the location of the central axis of the bore and then senses and calculates the position of the workpiece so that it can be aligned with the previously determined central axis. An arbor that precisely fits within the cylindrical bore is used in determining the location of the central axis. The arbor has a reference pin extending from one end that is centered on the arbor. It is the location of this reference pin that is sensed to determine the location of the central axis.

Once the central axis is determined, the arbor is removed from the cylindrical bore and the workpiece is inserted into the bore. The location of the workpiece is then sensed and the center of the workpiece is calculated. The center of the workpiece is compared to the location of the central axis and the location of the workpiece is adjusted until the center of the workpiece and the central axis are substantially coincident.

A computer system receives data representative of the location of the reference pin and the workpiece and calculates the center of each. These centers are referred to as the bore axis target and the rod target. The targets may be visually displayed on a computer display or they may merely be coordinates resident in the memory of the computer system. Regardless of the representation of the targets, they serve as an indication of the current position of the workpiece and the final desired position of the workpiece. An individual, or an automated system, may then assess the location information and adjust the location of the workpiece to obtain the desired location.

The position of the reference pin and the workpiece is found via a location determining system which may incorporate numerous position sensing technologies, including, but not limited to, electromechanical systems and optical systems. For example, a mechanical position transducer may be used to sense the locations and generate an electrical signal representative of the position data that is transmitted to the computer system. Alternatively, a plurality of light transmitters and light receivers may be used to generate and transmit beams of light from each of a plurality of light transmitters across the central axis to cooperating light receivers. The reference pin or the workpiece interferes with the transmission of the beam of light from each light transmitter to the cooperating light receiver resulting in a shadow being cast upon the opposing light receiver. The location of these shadows on the light receivers provides an indication of the location of the reference pin and workpiece.

BRIEF DESCRIPTION OF THE DRAWINGS

Without limiting the scope of the present invention as claimed below and referring now to the drawings and figures:

FIG. 1 is a partial cross section view, not to scale, of a body having a cylinder in accordance with the present invention;

FIG. 2 is a partial cross section view, not to scale, of the body and an arbor of the present invention;

FIG. 3 is a top plan view, not to scale, of the body and arbor along with a schematic of the location determining system and the computer system displaying the central axis of the cylinder in accordance with the present invention;

Also, in the various figures and drawings, the following reference symbols and letters are used to identify the various elements described herein below in connection with the several figures and illustrations: CX, LB, Md, Mp, and Q.

DETAILED DESCRIPTION OF THE INVENTION

The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

With reference generally now to FIG. 1 through FIG. 5 which illustrate the basic principles of the invention, in one of many preferable configurations, the method and system of the present invention are directed to precisely centering a workpiece 200, having a rod 210, on the central axis CX of a cylindrical bore 110 in a body 100. The method includes two distinct steps; first, sensing the location of the central axis CX of the bore 110 and, secondly, sensing the position of the rod 210 and aligning the center of the rod 210 with the central axis CX.

Figure 4:
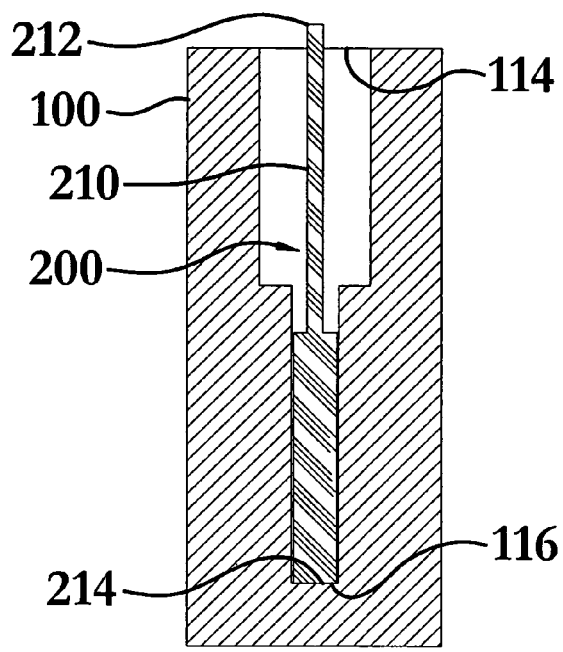
FIG. 4 is a partial cross section view, not to scale, of the body with a workpiece to be centered in accordance with the present invention.

In determining the location of the central axis CX of the bore 110, an arbor 300 is inserted into the proximal end 114 of the bore 110. The diameter of the arbor 300 is slightly less than the diameter of the bore 110 so that the cylindrical exterior surface 310 of the arbor 300 matingly slides within the cylindrical bore 100, in contact with the bore interior surface 112. The arbor 300 has a symmetrical reference pin 320 protruding from an end of the arbor 300. Precise machining of the cylindrical bore 100 and the arbor 300 ensure that the center of the reference pin 320 is coaxial with the central axis CX of the bore 110. The bore 110 has a proximal end 114, which is open during application of the present method, and a distal end 116, which may be closed. Additionally, the bore 110 may have a diameter 118 that is constant from the proximal end 114 to the distal end 116, or the bore 110 may have a number of sections of different diameter, as illustrated in FIG. 1, FIG. 2, and FIG. 4. As seen in FIG. 2, the method generally uses an arbor 300 and a reference pin 320 configured such that when the arbor 300 is inserted into the bore 110, the reference pin 320 extends beyond the proximal end 114 of the bore 110 to simplify the sensing of the location of the reference pin 320, however, this is not required. The reference pin 320 provides a reference surface on the arbor 300.

Next, the position of the reference pin 320 in a plane transverse to the central axis CX is sensed and pin position data is transmitted to a computer system 400. The position of the reference pin 320 is found via a location determining system 500. The location determining system 500 may sense the location of the reference pin 320 in any number of ways including, but not limited to, electromechanically and optically.

For example, a mechanical position transducer may be used to sense the location of the reference pin 320 and generate an electrical signal representative of the pin position data that is transmitted to the computer system 400. Such a mechanical position transducer is a contact-type transducer whereby sensors physically contact the reference pin 320 and the signal may be analog an AC or DC voltage or current (4–20 mA), or a digital data signal, for example.

Alternatively and preferably, the location determining system 500 may be an optical system. An optical location determining system 500 comprises apparatus for generating and transmitting a beam of light from each of a plurality of light transmitters across the central axis CX to cooperating light receivers. The reference pin 320 or the rod 210, as will be described later, interferes with the transmission of the beam of light from each light transmitter to the cooperating light receiver resulting in a shadow being cast upon the light receiver. The location of the shadow on the light receiver provides an indication of the location of the reference pin 320. Generally, a plurality of light beams are transmitted from light transmitters to light receivers at a predetermined spacing on opposite sides of the cylindrical bore 110 to sense the location of the reference pin 320. In one particular embodiment, a pair of cooperating light transmitters and light receivers, that are orthogonal to one another, are utilized to generate and transmit two light beams across the central axis. One specific embodiment of an optical location determining system 500 will be discussed in detail later herein with particular reference to optically centering the displacer rod of a free piston cooler. Further, any of a number of various types of light transmitters and light receivers may be used in the present invention. In one embodiment, light transmitters incorporating light emitting diodes to generate the beams of light and light receivers having charge coupled devices are used.

The computer system 400 receives the signals from the location determining system 500 and then computes the center of the reference pin 320 from the pin position data. The computer system 400 then represents the center of the reference pin 320, in other words, the central axis CX of the bore 110 is displayed, as a bore axis target 414, as illustrated on the computer display 410 of FIG. 3. The computer system 400 may represent the bore axis target 414 in any number of ways. For instance, the bore axis target 414 may be visually represented as cross-hairs, or a dot, on a computer display 410. Alternatively, the bore axis target 414 may only exist as stored data, such as coordinates, in the memory of the computer system 400 or the coordinates may be displayed numerically. While the computer system 400 is generally discussed and illustrated herein as a laptop computer, or traditional central processing unit, the computer system 400 may be virtually any processor platform, as only minimal computing power is required for this method. For example, the computer system 400 may be conveniently packaged in a portable programmable logic controller for ease of use on a production line.

The arbor 300 is then removed from the bore 110 and the workpiece 200 is inserted into the bore 100, as illustrated in FIG. 4. The proximal end 212 of the workpiece rod 210 generally extends from the proximal end 114 of the bore 110, although that is not necessary. The distal end 214 of the rod may generally rest on the distal end 116 of the bore 110 during application of this method to this particular embodiment. Next, the position of the rod 210 in a plane transverse to the central axis CX is sensed, preferably in the same manner as the arbor pin position was sensed, and the rod position data is transmitted to the computer system 400. Of course it is not necessary to directly sense the rod itself if another reference surface is accurately positioned on the rod, such as a coaxial extension of the rod.

Figure 5:
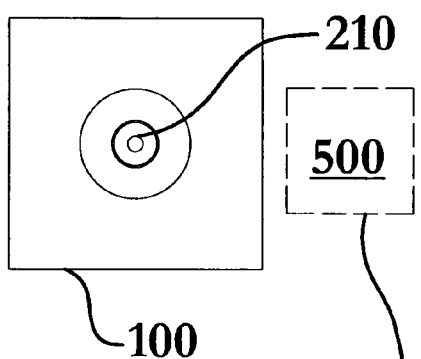
FIG. 5 is a top plan view, not to scale, of the body and workpiece along with a schematic of the location determining system and the computer system displaying the central axis of the cylinder and the position of the workpiece in accordance with the present invention.
Figure 5:
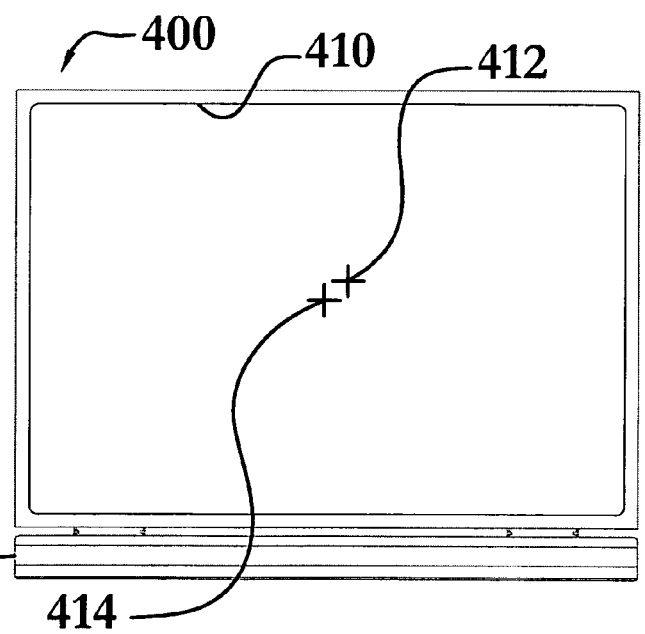

The computer system 400 then computes a center of the rod 210 from the rod position data and represents the rod center as a rod target 412. As previously discussed with reference to the bore axis target 414, the computer system 400 may represent the rod target 412 in any number of ways, such as those described above. For instance, the rod target 412 may be visually represented as cross-hairs, or a dot, on a computer display 410. The computer display 410 of FIG. 5 illustrates both the previously determined bore axis target 414 and the rod target 412 on the same computer display 410. The rod target 412 of FIG. 5 is not aligned with the bore axis target 414 and is therefore not on the central axis CX.

Lastly, the position of the rod 210 is adjusted to bring the rod target 412 substantially coincident with the bore axis target 414, indicating that the rod 210 is aligned on the central axis CX. This step of adjusting the rod 210 position may be accomplished manually or it may be automated. In many applications the degree to which the rod 210 position needs to be adjusted is very small and requires finely calibrated equipment.

In embodiments where the bore axis target 414 and the rod target 412 are actually displayed on a computer display 410, as seen in FIG. 5, an operator may visually identify the location of the rod 210 with respect to the position of the central axis CX, or bore axis target 414, and adjust the location of the rod 210 accordingly until the rod target 412 and the bore axis target 414 are substantially coincident. Alternatively, embodiments wherein the rod target 412 and bore axis target 414 only exist as stored data in the memory of the computer system 400, the computer software may incorporate and display vector instructions to an operator to substantially align the targets 412, 414, or the computer system 400 may instruct an automated positioning system to substantially align the targets 412, 414. As one with skill in the art will appreciate, the computer system 400 may incorporate audible signals to instruct the alignment or indicate how close the rod target 412 is to the bore axis target 414.

Following alignment, some type of support or guide structure associated with the rod 210 is usually then tightened in position, as described below with respect to the preferred embodiment.

The method and apparatus of the invention have particular application in the field of free piston machines, particularly free piston Stirling cycle coolers and engines, where it is sometimes essential to have the center of a displacer rod coaxial with the central axis of a cylinder. While the shapes of the cylindrical bore 110 and the workpiece 200 in FIG. 1 through FIG. 5 are similar to those of a free piston, Stirling cycle machine, application of the current method to a free piston cooler 700 is illustrated in detail in FIG. 6 through FIG. 14, and is described below.

Figure 6:
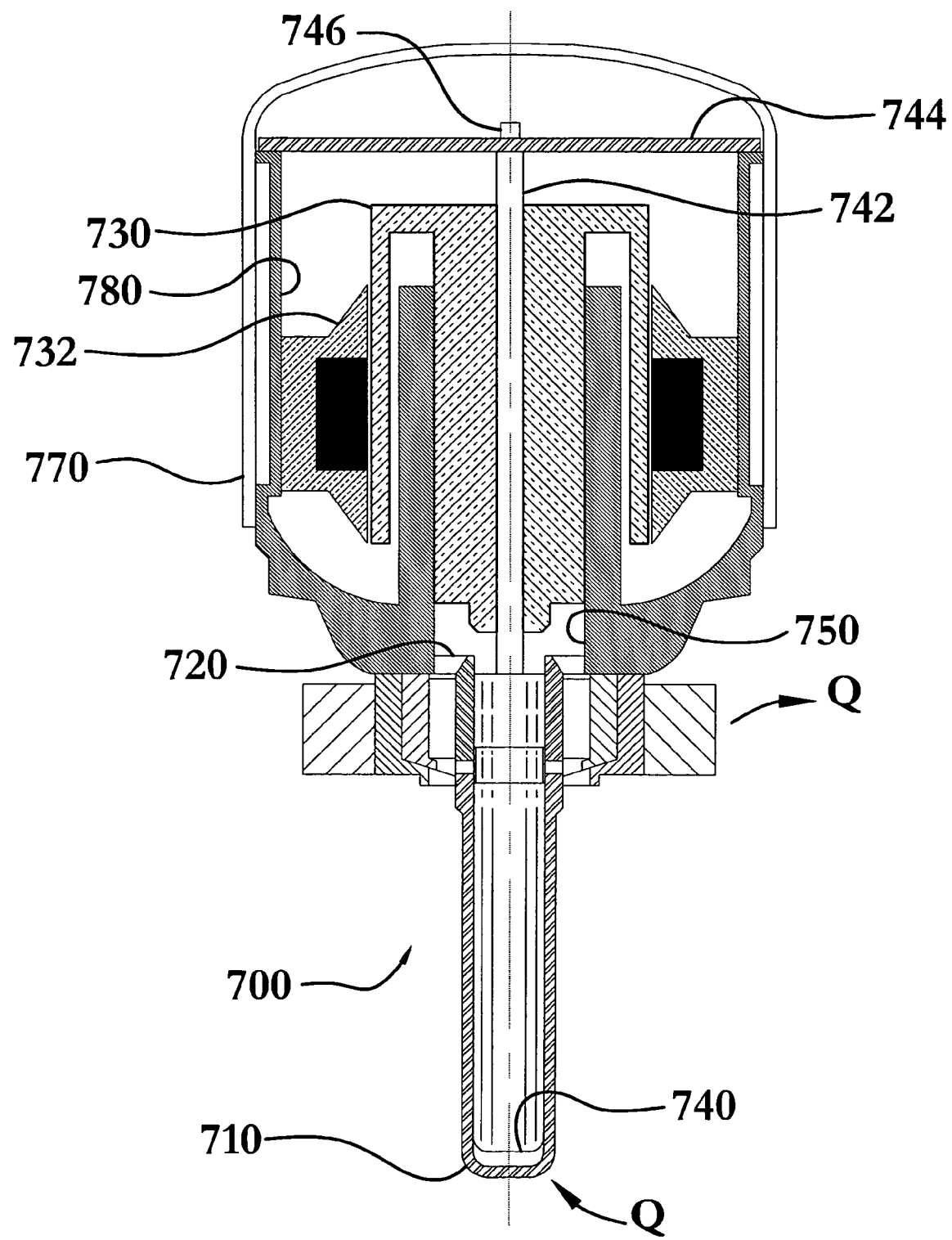
FIG. 6 is a partial cross section view, not to scale, of a free piston cryocooler showing the component being centered in accordance with the present invention.
Figures 7A, 7B:
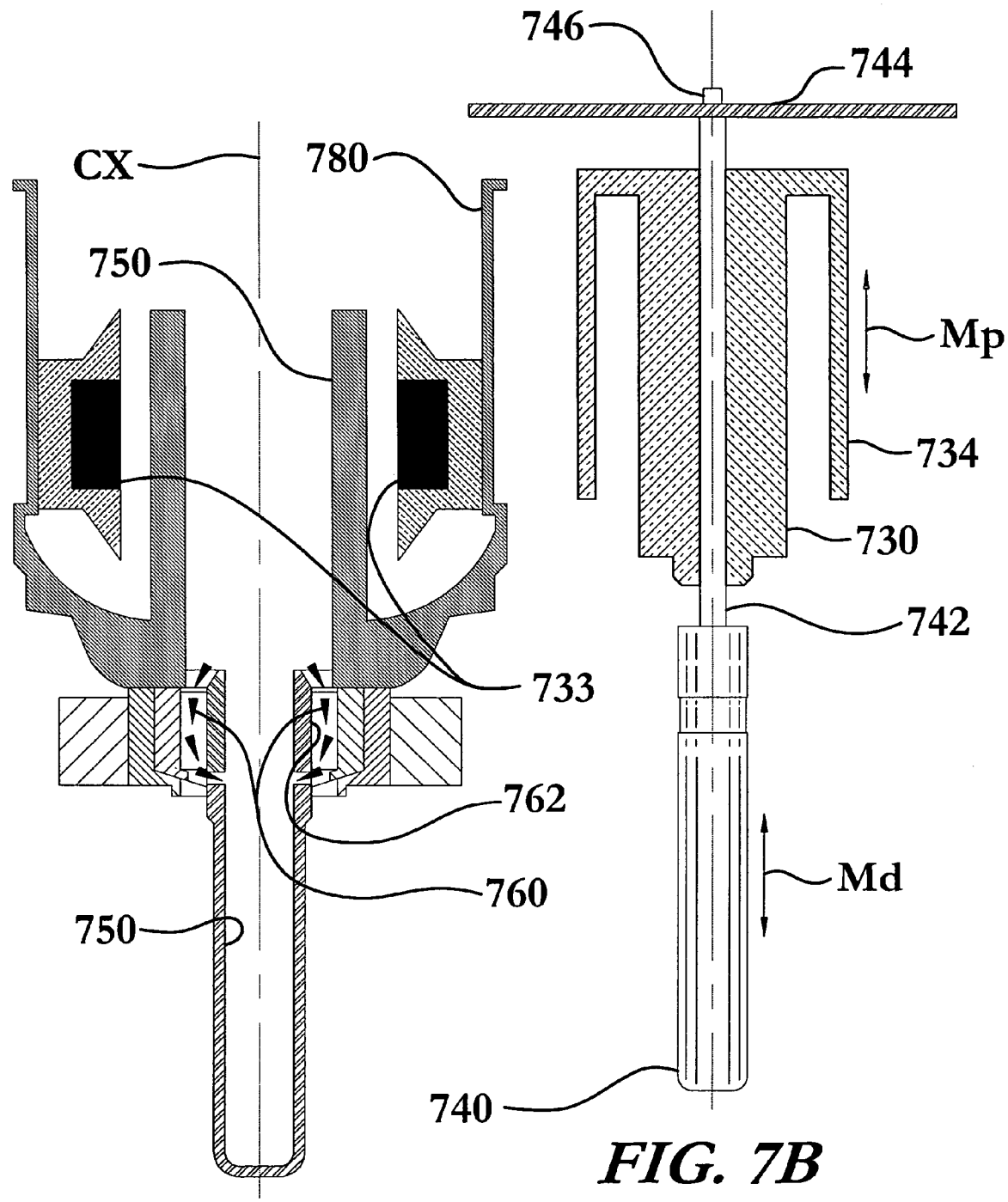
FIG. 7A is a partial cross section view, not to scale, of the stationary components of the free piston cooler of FIG. 6 in a partially disassembled condition.
FIG. 7B is a partial cross section view, not to scale, of the reciprocating components of the free piston cooler of FIG. 6 in a partially disassembled condition.

With reference now to FIG. 6, FIG. 7A, and FIG. 7B, the free piston cooler 700 has a cold head 710 and a warm end 720. The free piston cooler 700 includes a piston 730, driven by a piston driver 732, reciprocating partially within a cylinder 750, and a displacer 740 having a displacer rod 742, passing through an inner bore of the piston 730, attached to a displacer spring 744 by a connector 746, all enclosed in a housing 770. The piston driver 732 is a linear motor having an armature winding 733 which drives magnets 734 that are fixed to the piston 730, as seen in FIG. 7B. The displacer spring 744 that is illustrated is a planar spring like that shown in U.S. Pat. No. 5,525,845. The housing 770 is removed in FIG. 7A and FIG. 7B and the components of the free piston cooler 700 that reciprocate are shown in FIG. 7B, while the stationary components are illustrated in FIG. 7A. The displacer 740 reciprocates within the lower portion of the cylinder 750, indicated by motion indicator Md in FIG. 7B, between the cold head 710 and the warm end 720, and the piston 730 reciprocates within the upper portion of the cylinder 750 on the displacer rod 742 and bounded by the cylinder 750.

During operation of the free piston cooler 700, the piston driver 732, typically an electric linear motor, moves the piston 730 in the directions of motion indicated by Mp in FIG. 7B. The movement of the piston 730 from a first position to a second position, where the direction of travel reverses, defines a stroke, also referred to as amplitude. In operation, a working fluid, generally helium, is transported, compressed, and expanded by the combined movement of the piston 730 and the displacer 740. As previously mentioned, the movement of the piston 730 is effected by the piston driver 732.

The motion of the displacer 740 is the result of many combined actions including, but not limited to, changes in the working fluid pressure created by the movement of the piston 730, energy storing spring effects in the free piston cooler 700 introduced by the displacer spring 744, changing properties of the working fluid, and other internal displacer control devices. The movement of the displacer 740, indicated by Md, shuttles the working fluid between the cold head 710 and the warm end 720, generally through a working fluid passage 760 having a regenerator 762, illustrated in FIG. 7A.

The regenerator 762 consists of an energy storage medium to and from which the working fluid may transfer energy as it cycles from the cold head 710 to the warm end 720, and back again. Modern regenerators 762 may incorporate pieces of fine porous metal between the cold head 710 and the warm end 720 to prevent unnecessary heat loss and improve efficiency. Heat, indicated by Q, is absorbed at the cold head 710 during expansion of the working fluid and heat Q is rejected at the warm end 720 during compression of the working fluid. Heat exchangers are generally attached to the cold head 710 and the warm end 720 to improve the transfer of thermal energy to, and away from, the free piston cooler 700.

The piston 730 in the free piston cooler 700 reciprocates within and is bounded by the cylinder 750. The piston 730 is suspended away from the cylinder walls with a gas bearing system. Peak efficiency is achieved in part by ensuring an extremely close fit, such as 12—13 microns radial clearance between the piston 730 and the cylinder 750. The displacer rod 742 reciprocates within and is bounded by the inner bore of the piston 730. The reciprocating motion between the piston 730 and the displacer rod 742 is out of phase and of different stroke lengths, resulting in a relative motion between the two parts. There is no gas bearing system that will suspend the displacer rod 742 away from the inner bore of the piston 730, therefore, near perfect alignment between the center of the cylinder 750 and the displacer rod 742 is desired so that the displacer rod does not contact the inner bore of the piston 730. Contact between the displacer rod 742 and the inner bore of the piston 730 will cause wear on the displacer rod 742 surface and severe contact pressure can overcome the piston 730 gas bearing causing the piston 730 surface to contact the cylinder 730 surface which can cause undesired wear and possible free piston cooler 700 failure. Therefore, one application of the present invention is to align the displacer rod 742 of a free piston cooler 700 with the central axis CX of the cylinder to avoid wear of the interfacing, sliding surfaces.

Figure 8:
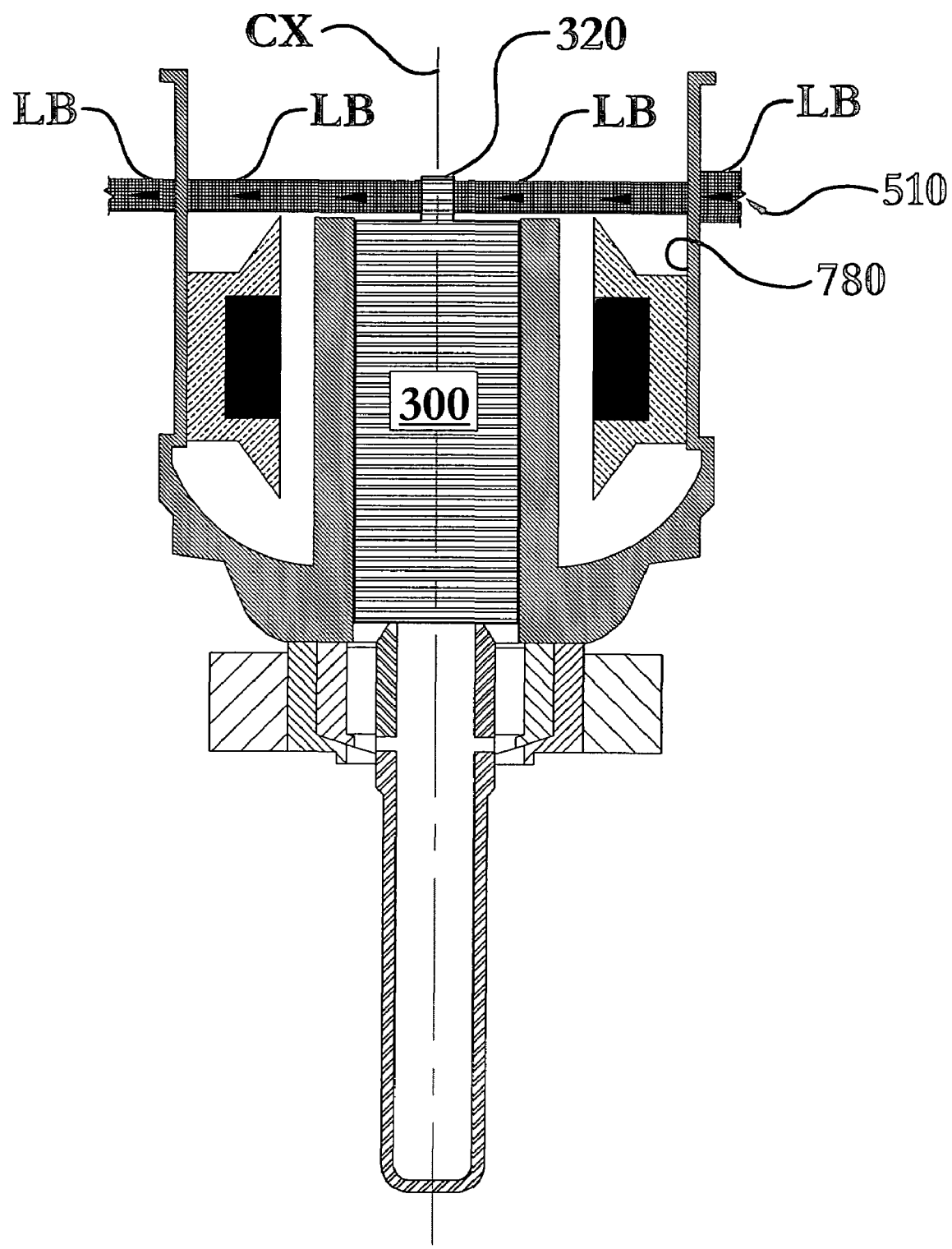
FIG. 8 is a partial cross section view, not to scale, of a portion of the free piston cooler and arbor of the present invention.
Figure 9:
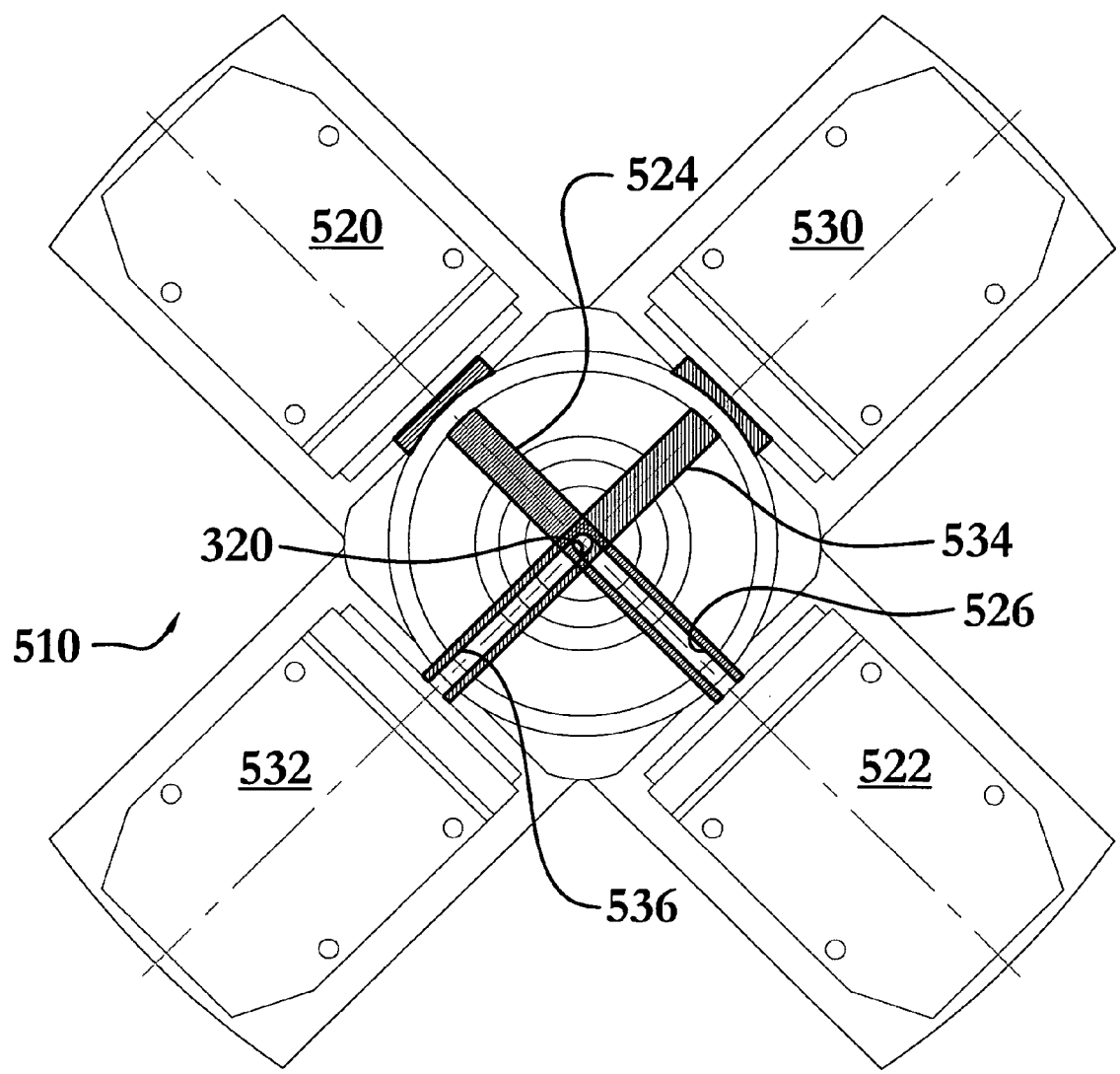
FIG. 9 is a top plan view, not to scale, of a portion of the free piston cooler, arbor, and optical system of the present invention.
Figure 12:
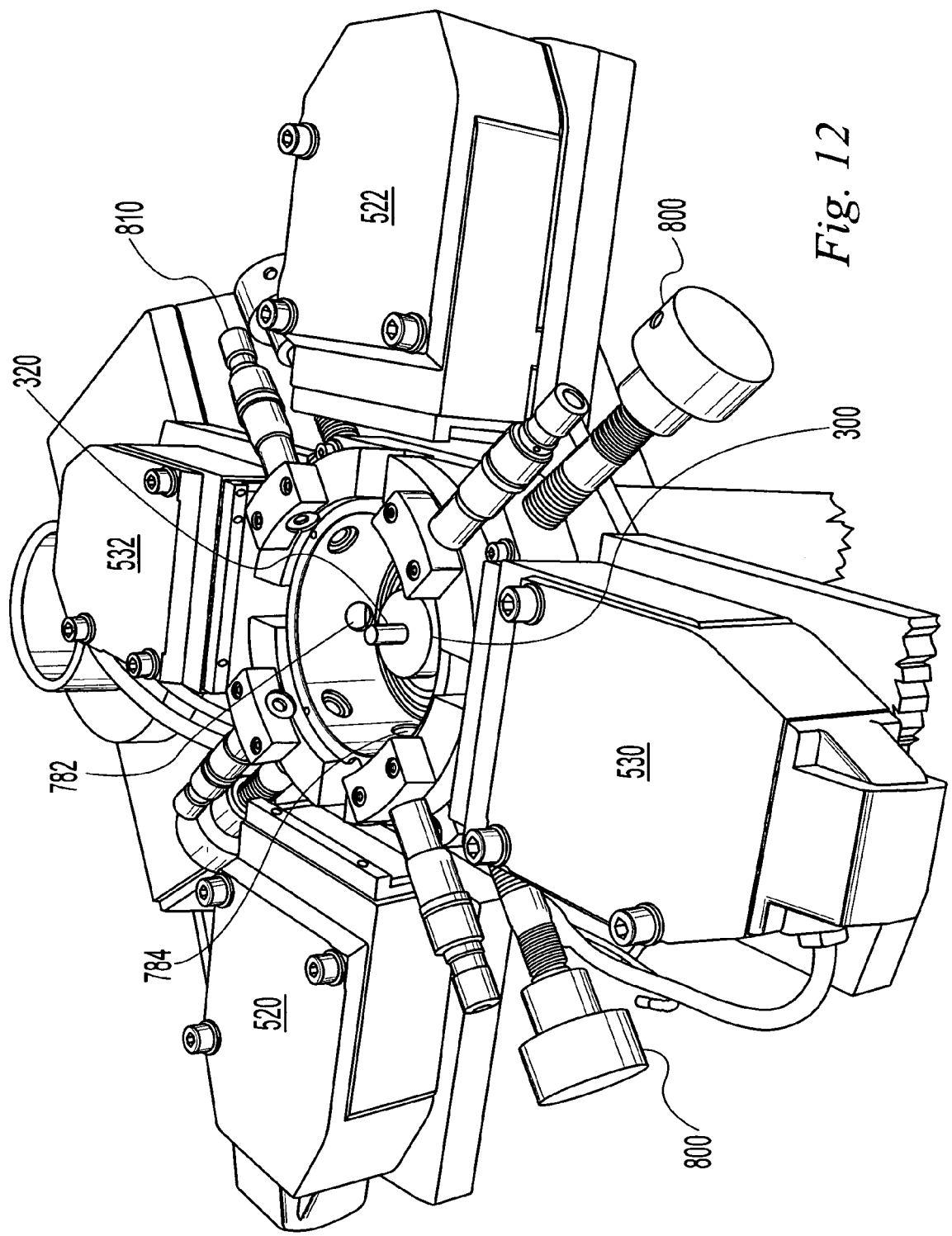
FIG. 12 is an elevated perspective view, not to scale, of the free piston cooler, arbor, and optical system of the present invention.

Application of the present method to the free piston cooler 700 begins with the insertion of the arbor 300 into the cylinder 750, as illustrated in FIG. 8 and FIG. 12. Next, at least one light beam LB is generated and transmitted, by the optical location determining system 510, across the central axis CX. Generally, the casing 780 is formed with holes through which the light beam LB can pass. Further, the optical location determining system 510 is configured so as to conveniently clamp onto the casing 780 with at least one clamping device 800, shown in FIG. 12. This is better illustrated in the top plan view of FIG. 9. In the embodiment of FIG. 12, four clamping devices 800 secure the optical location determining system 510 to the casing 780 and take the form of large knurled screws 800.

Two light transmitters 520, 530 generate and transmit beams of light 524, 534 across the reference pin 320 of the arbor 300. As the reference pin 320 interferes with the first light beam 524 a first light beam shadow 526 is created and cast upon the first light receiver 522. Similarly, as the reference pin 320 interferes with the second light beam 534 a second light beam shadow 536 is created and cast upon the second light receiver 532. One exemplary embodiment incorporates an off-the-shelf optical location determining system 510, namely a Keyence optical positioning system. In this embodiment, the light transmitters 520, 530 are Keyence LS 7030T transmitters and the light receivers 522, 532 are Keyence LS 7030R receivers.

In this particular embodiment the first light beam 524 and the second light beam 534 are orthogonal to each other, however this is not required. Virtually any predetermined relationship between the light beams 524, 534 may work with this method. Similarly, while is it most convenient to utilize a symmetrical reference pin 320, it is not a requirement provided that the position of the reference pin 320 and the light beams 524, 534 are carefully positioned to a predetermined relationship. Any asymmetry needs to be accounted for in the software, specifically in the mathematical computations made by the computer. Likewise, one with skill in the art will appreciate that the present method will work equally as well with workpiece rods 210 that are noncircular, or even asymmetric, provided predetermined relationships are established and accounted for in the software.

The light receivers 522, 532 then transmit pin position data, determined from the locations of the shadows 526, 536, to the computer system 400. The computer system 400 then computes the center of the reference pin 320 and represents the center as the bore axis target 414, seen previously in FIG. 3, which is also the location of the central axis CX.

Figure 10:
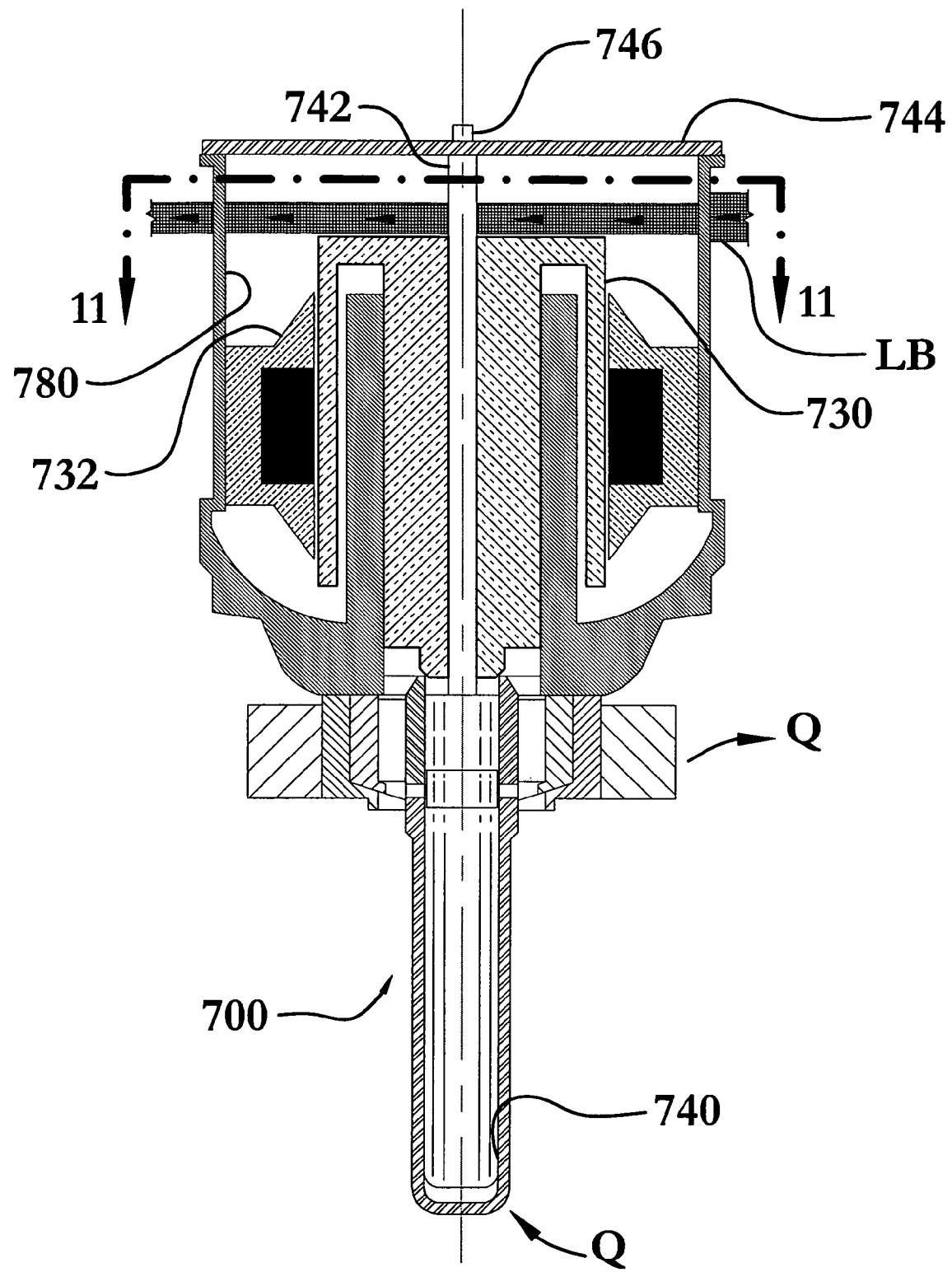
FIG. 10 is a partial cross section view, not to scale, of a portion of the free piston cooler and workpiece of the present invention.
Figure 11:
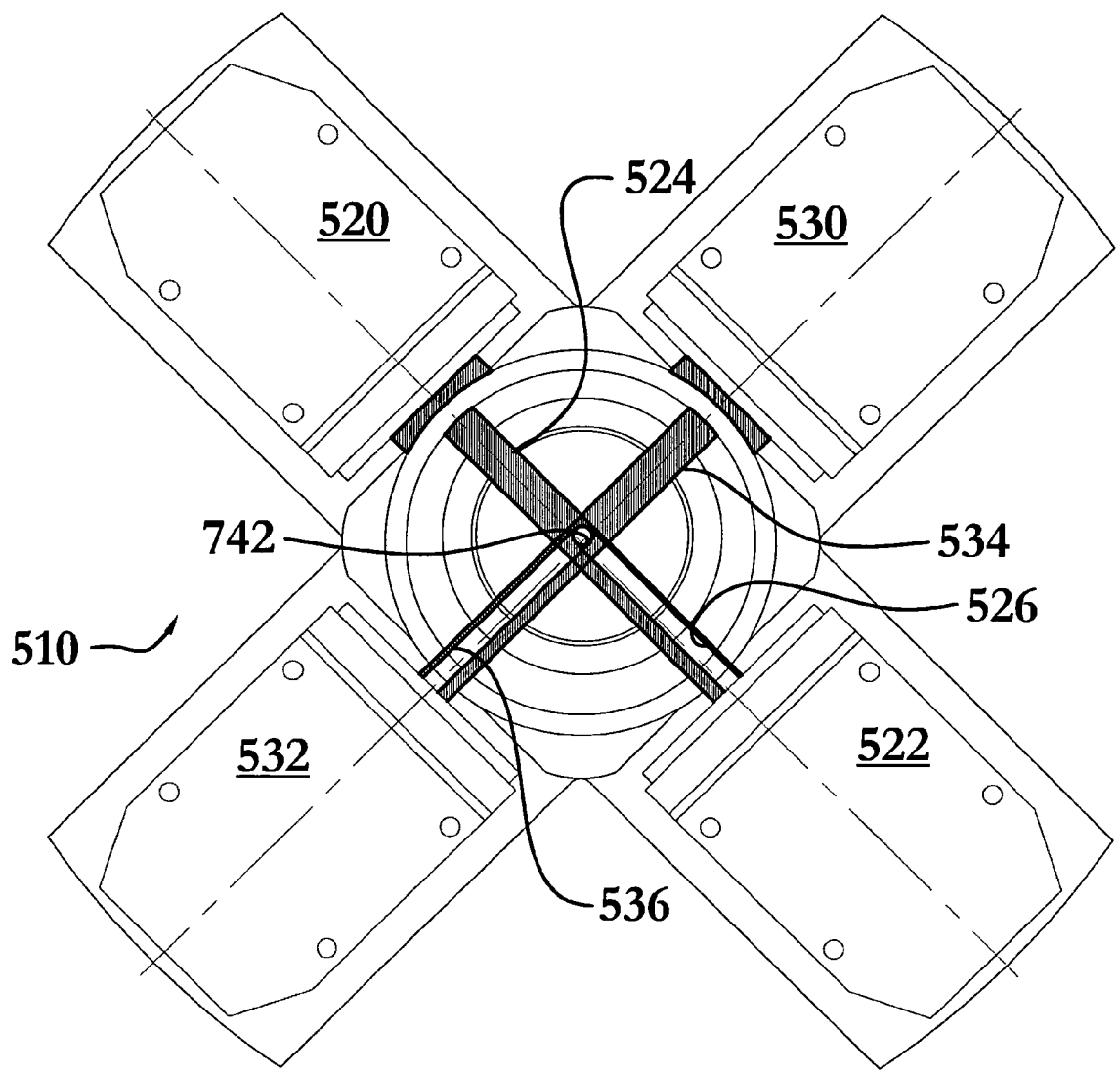
FIG. 11 is a partial cross section view, not to scale, of a portion of the free piston cooler, workpiece, and optical system of the present invention, taken along section line 11—11 in FIG. 10.
Figure 13:
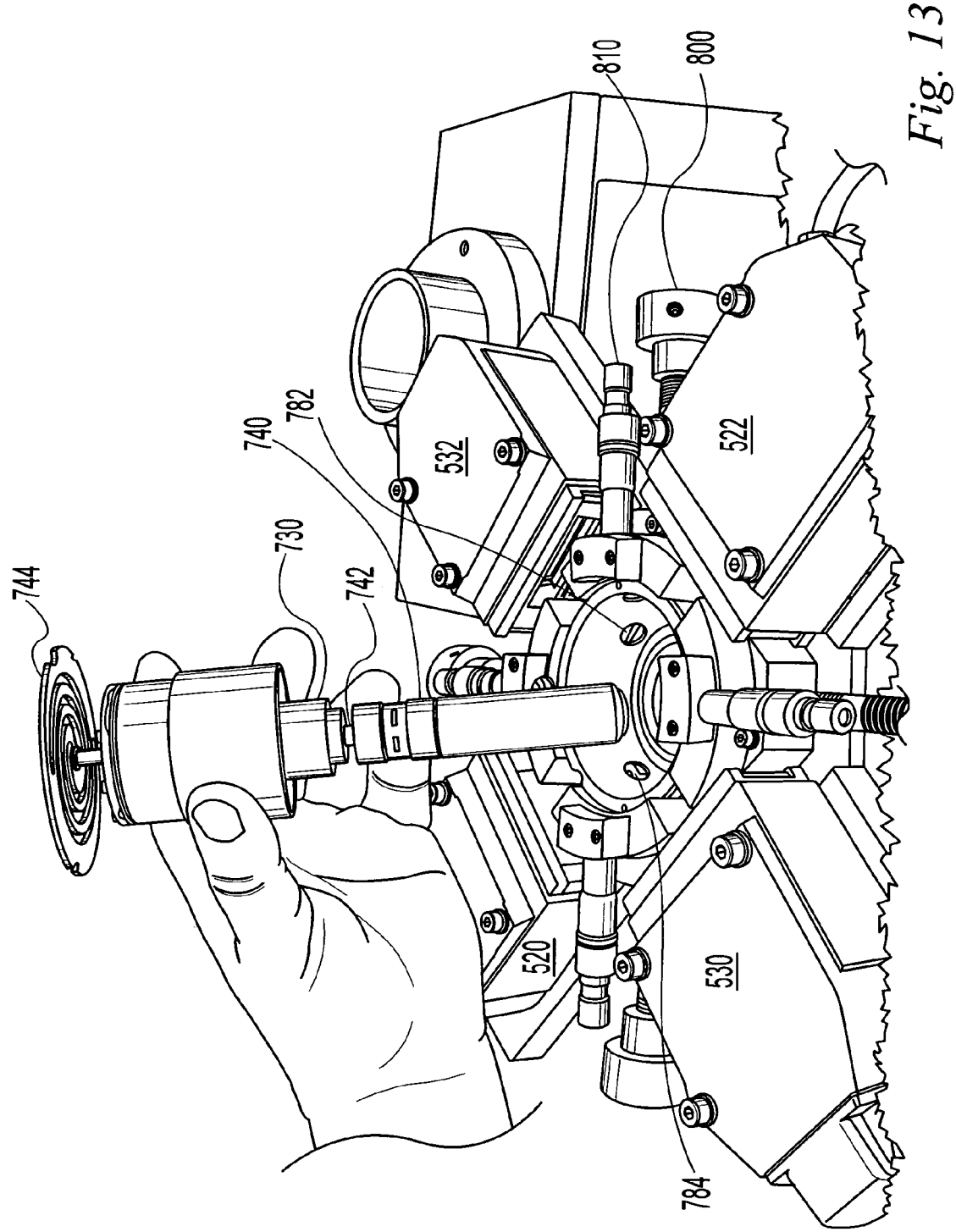
FIG. 13 is an elevated perspective view, not to scale, of the free piston cooler, displacer, displacer rod, piston, displacer spring, and optical system of the present invention.
Figure 14:
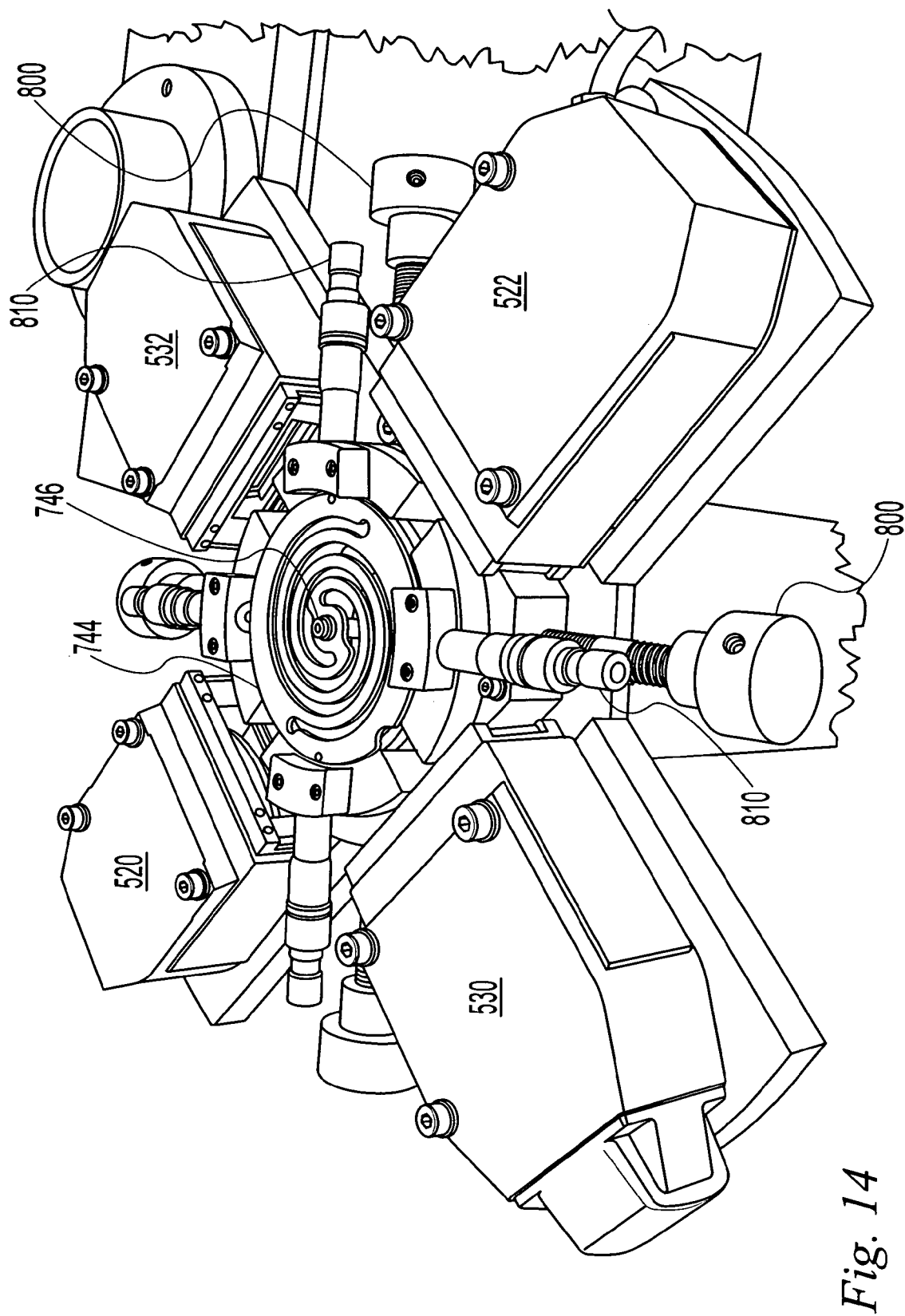
FIG. 14 is an elevated perspective view, not to scale, of the free piston cooler with the displacer, displacer rod, piston, and displacer spring installed and ready for centering, and optical system of the present invention.

Next, the arbor 300 is removed from the cylinder 750 and the reciprocating components, namely the displacer 740, the displacer rod 742, the piston 730, and the displacer spring 744 are positioned as illustrated in FIG. 10, FIG. 13, and FIG. 14. Conveniently, the gas bearing system of the displacer 740 effectively centers the lower portion of the displacer rod 742 in the cylinder 750 during cooler operation, thereby only requiring accurate positioning of the end of the displacer rod 742 nearest the displacer spring 744. Again, at least one light beam LB is generated and transmitted across the central axis CX. This is better illustrated in the top plan view of FIG. 11. Here, the two light transmitters 520, 530 now generate and transmit beams of light 524, 534 across the displacer rod 742. As displacer rod 742 interferes with the first light beam 524 a first light beam shadow 526 is created and cast upon the first light receiver 522. Similarly, as the displacer rod 742 interferes with the second light beam 534 a second light beam shadow 536 is created and cast upon the second light receiver 532. Since the edges of the shadow are detected by light receivers, the position of the center of the each shadow can be computed to provide two-dimensional, numerical coordinate position data in both the x and y axes. These numerical coordinates represent the position of the center line of the cylinder so long as the optical system is not moved during the subsequent process of removing the arbor and inserting the displacer and piston.

The light receivers 522, 532 transmit rod position data, determined from the locations of the shadows 526, 536, to the computer system 400. The computer system 400 then computes the center of the displacer rod 742 and represents the center as the rod target 412, as previously seen in FIG. 5. As previously disclosed, the displacer rod 742 may now be manually, or automatically, repositioned until the rod target 412 is substantially coincident with the bore axis target 414. The embodiment of FIG. 12, FIG. 13, and FIG. 14 illustrates a plurality of adjustment devices 810, namely precision calipers, used to position the displacer spring 744 so that the displacer rod 742 is substantially centered within the cylinder 750. Once the proper position is located, the displacer spring 744 is attached to the casing 780 to fix the location of the displacer rod 742.

It is important that the location determining system be rigidly fixed to the body in which the cylindrical bore is formed. Any movement of the location determining system with respect to the body during performance of the alignment will generate erroneous position data. Therefore, it is desirable to incorporate a sensing system to detect such motion, input its data to the computer and that the computer software be written to monitor the sensing system and display or sound a warning that movement has occurred and the alignment results are erroneous. The preferred way of accomplishing this is to sense the position of the four holes through the casing through which the light beams are transmitted. These holes are arranged in two orthogonally aligned opposite pairs of holes through the casing. Two such holes 782 and 784 are visible in FIGS. 12 and 13. Light transmitters are used which transmit a light beam that is wider than the holes through the casing so that the light falling upon the light receivers has outer boundaries representing the shadow cast by the casing at the edges of the holes in the outer casing and an inner shadow representing the arbor pin or the displacer rod. This creates two spaced light beams falling upon the light receivers. The innermost boundaries of those light beams represent the outer edges of the arbor pin or the displacer rod and the outermost boundaries represent the edges of the holes. These edges provide data representing the location of the hole edges and that data is also transmitted to the computer. The computer then monitors the position of those hole edges and, if they move during the alignment process, the computer then signals that such motion has occurred and therefore the alignment may be in error.

While the description of the free piston cooler embodiment is directed toward an optical location determining system, one with skill in the art will appreciate that the previously disclosed electromechanical determining system may be just as easily applied.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

We claim:

1. A method for centering a workpiece on the central axis of a cylindrical bore in a body, the workpiece including a rod, the method comprising:
    (a) inserting into an end of the bore an arbor having a cylindrical exterior surface matingly slidable within the cylindrical bore, the arbor having a symmetrical reference pin protruding from an end of the arbor coaxially with the central axis;
    (b) sensing the position of the reference pin in a plane transverse to the central axis and transmitting pin position data to a computer system;
    (c) computing a center of the reference pin from the pin position data and representing the reference pin center as a bore axis target;
    (d) removing the arbor from the bore and inserting the workpiece into the bore with the rod protruding from the end of the bore;
    (e) sensing the position of the rod in the plane traverse to the central axis and transmitting rod position data to the computer system;
    (f) computing a center of the rod from the rod position data and representing the rod center as a rod target; and
    (g) adjusting the position of the rod to bring the rod target substantially coincident with the bore axis target.

2. The method in accordance with claim 1, wherein the position of the reference pin and the position of the rod are electromechanically sensed.

3. The method in accordance with claim 1, wherein the position of the reference pin and the position of the rod are optically sensed.

4. The method in accordance with claim 3, wherein the position sensing comprises generating and transmitting a beam of light from each of a plurality of light transmitters across the central axis to cooperating light receivers, the reference pin and rod casting a shadow upon the opposing receivers to provide an indication of the location of the reference pin or the rod with respect to the central axis.

5. The method of claim 4, wherein two light beams are transmitted orthogonally across the central axis between two cooperating pairs of light transmitters and light receivers.

6. The method of claim 4, wherein the light transmitters incorporate light emitting diodes to generate the beams of light and the light receivers are charge coupled devices.

7. The method in accordance with claim 1, wherein the bore is a bore of a free piston machine, the workpiece is a connecting rod of a free piston machine, and a displacer is positioned at a distal end of the connecting rod and substantially centers the distal end of the connecting rod within the bore.

* * * * *